US006796914B2

United States Patent
Berdugo et al.

(10) Patent No.: US 6,796,914 B2
(45) Date of Patent: Sep. 28, 2004

(54) MOVABLE GOALIE

(75) Inventors: Simon Berdugo, Hollywood, FL (US); Andrew Small, Montreal (CA)

(73) Assignee: ASSB Holding Company, Hollywood, FL (US)

( * ) Notice: Subject to any disclaimer, the term of this patent is extended or adjusted under 35 U.S.C. 154(b) by 77 days.

(21) Appl. No.: 10/234,550

(22) Filed: Sep. 4, 2002

(65) Prior Publication Data

US 2003/0108852 A1 Jun. 12, 2003

(51) Int. Cl.[7] .............................................. A63B 69/00
(52) U.S. Cl. ....................... 473/439; 273/359; 434/247
(58) Field of Search .................................. 473/446, 422, 473/439, 441, 442, 443, 445; 273/403, 359; 434/247, 365

(56) References Cited

U.S. PATENT DOCUMENTS

| | | | | |
|---|---|---|---|---|
| 3,391,936 A | * | 7/1968 | Grimes | 473/439 |
| 3,467,380 A | * | 9/1969 | Bonacci | 473/439 |
| 3,658,329 A | * | 4/1972 | Ciccarello | 473/454 |
| 3,659,848 A | * | 5/1972 | DePew | 473/443 |
| 3,765,675 A | * | 10/1973 | DiMarzio | 473/446 |
| 4,168,062 A | | 9/1979 | McCarthy et al. | |
| 4,304,194 A | * | 12/1981 | Boykin et al. | 119/51.04 |
| 4,489,940 A | | 12/1984 | Amundson | |
| 4,529,390 A | | 7/1985 | Levy et al. | |
| D325,754 S | | 4/1992 | Goldblatt | |
| 5,330,175 A | * | 7/1994 | Kim | 273/397 |
| 5,582,404 A | | 12/1996 | Parzino | |
| 5,647,747 A | * | 7/1997 | Macri et al. | 434/247 |
| 5,772,535 A | | 6/1998 | Murphy | |
| 5,772,538 A | | 6/1998 | Sztykiel et al. | |
| 5,776,019 A | * | 7/1998 | Kronenberger | 473/446 |
| 5,928,093 A | | 7/1999 | Lai | |

\* cited by examiner

Primary Examiner—Gregory Vidovich
Assistant Examiner—M. Chambers
(74) Attorney, Agent, or Firm—Laurence A. Greenberg; Werner H. Stemer; Ralph E. Locher

(57) ABSTRACT

An assembly includes a track having a length; a goalie structure; and a base that supports the goalie structure on top of the track. The base has wheels and a motor cooperating with at least one of the wheels for moving the goalie structure along the length of the track. A player, for example, a hockey player or a soccer player, can practice scoring goals against the goalie structure. The goalie structure is preferably inflatable, and the track is preferably constructed from a plurality of track sections. The track preferably has grooves and the base preferably has flanges that cooperate with the grooves to keep the base secured in the track when the player bumps into the goalie structure. All of the components of the assembly can be provided as a kit that can be assembled and disassembled as desired.

4 Claims, 10 Drawing Sheets

MOVABLE GOALIE

BACKGROUND OF THE INVENTION

Field of the Invention

The invention relates to an assembly for moving a goalie structure on a game-playing surface in front of a goal so that a player, for example, a hockey player or a soccer player, can practice scoring goals against the goalie structure. The assembly can also be used in place of a human goalie during live game play.

SUMMARY OF THE INVENTION

It is accordingly an object of the invention to provide an assembly for moving a goalie structure on a game-playing surface in front of a goal.

With the foregoing and other objects in view there is provided, in accordance with the invention, an assembly that includes: a track having a length; a goalie structure; and a base for supporting the goalie structure on top of the track.

The base has wheels and a motor cooperating with at least one of the wheels in order to move the goalie structure along the length of the track.

In accordance with an added feature of the invention, the track is constructed from a plurality of track sections.

In accordance with an additional feature of the invention, the track is linear.

In accordance with another feature of the invention, the track has a side formed with a groove extending along the side of the track; and the base is formed with at least one flange extending into the groove of the track.

In accordance with a further feature of the invention, the track has a first side formed with a first groove extending along the first side of the track and the track has a second side formed with a second groove extending along the second side of the track. The first grove is opposite the second groove. The base has at least one flange extending into the first groove; and the base has at least one flange extending into the second groove.

In accordance with a further added feature of the invention, the base includes a first stabilizer wheel located near the flange that extends into the first groove; and the base includes a second stabilizer wheel located near the flange that extends into the second groove.

In accordance with a further additional feature of the invention, the goalie structure is inflatable.

In accordance with another added feature of the invention, the goalie structure is formed with loops; and the base is formed with retractable pins for insertion into the loops to secure the goalie structure to the base.

In accordance with another additional feature of the invention, there is provided a transmitter for transmitting control signals. The base includes a receiver for receiving the control signals and a control unit for controlling the motor in response to the control signals.

In accordance with another further feature of the invention, the base includes a control unit for causing the motor to move the base between a plurality of fixed positions along the length of the track.

In accordance with yet an added feature of the invention, the plurality of the fixed positions is five positions.

In accordance with yet an additional feature of the invention, the control unit causes the motor to randomly move the base between the plurality of the fixed positions.

In accordance with yet another feature of the invention, there is provided a puck having a transmitter. In this case, the base includes a receiver unit constructed for making a determination as to whether the puck is towards a particular side direction with respect to the base; and the receiver unit includes a control unit for causing the motor to move the base toward the side direction.

In accordance with yet a further feature of the invention, there is provided a ball having a transmitter. In this case, the base includes a receiver unit constructed for making a determination as to whether the ball is towards a particular side direction with respect to the base; and the receiver unit includes a control unit for causing the motor to move the base toward the side direction.

With the foregoing and other objects in view there is also provided, in accordance with the invention, a kit for assembling a moveable goalie. The kit includes: a plurality of track sections that can be assembled to form a track having a length; an inflatable goalie structure having at least one first connector; and a base having at least one second connector for mating with the first connector to attach the inflatable goalie structure to the base. The base is configured to be moveable on top of the track. The base has wheels and a motor cooperating with at least one of the wheels in order to move the goalie structure along the length of the track.

In accordance with an added feature of the kit, each one of the plurality of the track sections has a first side formed with a first groove extending along the first side; and each one of the plurality of the track sections has a second side formed with a second groove extending along the second side. The first grove is opposite the second groove. The base has at least one flange constructed to extend into the first groove of at least one of the plurality of the track sections when the base is configured on the track. The base has at least one flange constructed to extend into the second groove of at least one of the plurality of the track sections when the base is configured on the track.

In accordance with another feature of the kit, the base includes a first stabilizer wheel located near the flange that is constructed to extend into the first groove; and the base includes a second stabilizer wheel located near the flange that is constructed to extend into the second groove.

In accordance with a further feature of the kit, there is provided, a transmitter for transmitting control signals. In this case, the base includes a receiver for receiving the control signals and a control unit for controlling the motor in response to the control signals.

In accordance with a further added feature of the kit, the base includes a control unit for causing the motor to move the base between a plurality of fixed positions along the length of the track.

In accordance with yet an added feature of the kit, the control unit causes the motor to randomly move the base between the plurality of the fixed positions.

In accordance with yet an additional feature of the kit, there is provided, a puck having a transmitter. In this case, the base includes a receiver unit constructed for making a determination as to whether the puck is towards a particular side direction with respect to the base; and the receiver unit includes a control unit for causing the motor to move the base toward the side direction.

In accordance with yet another feature of the kit, there is provided, a ball having a transmitter. In this case, the base includes a receiver unit constructed for making a determination as to whether the ball is towards a particular side direction with respect to the base; and the receiver unit includes a control unit for causing the motor to move the base toward the side direction.

DESCRIPTION OF THE PREFERRED EMBODIMENTS

Figure 1:
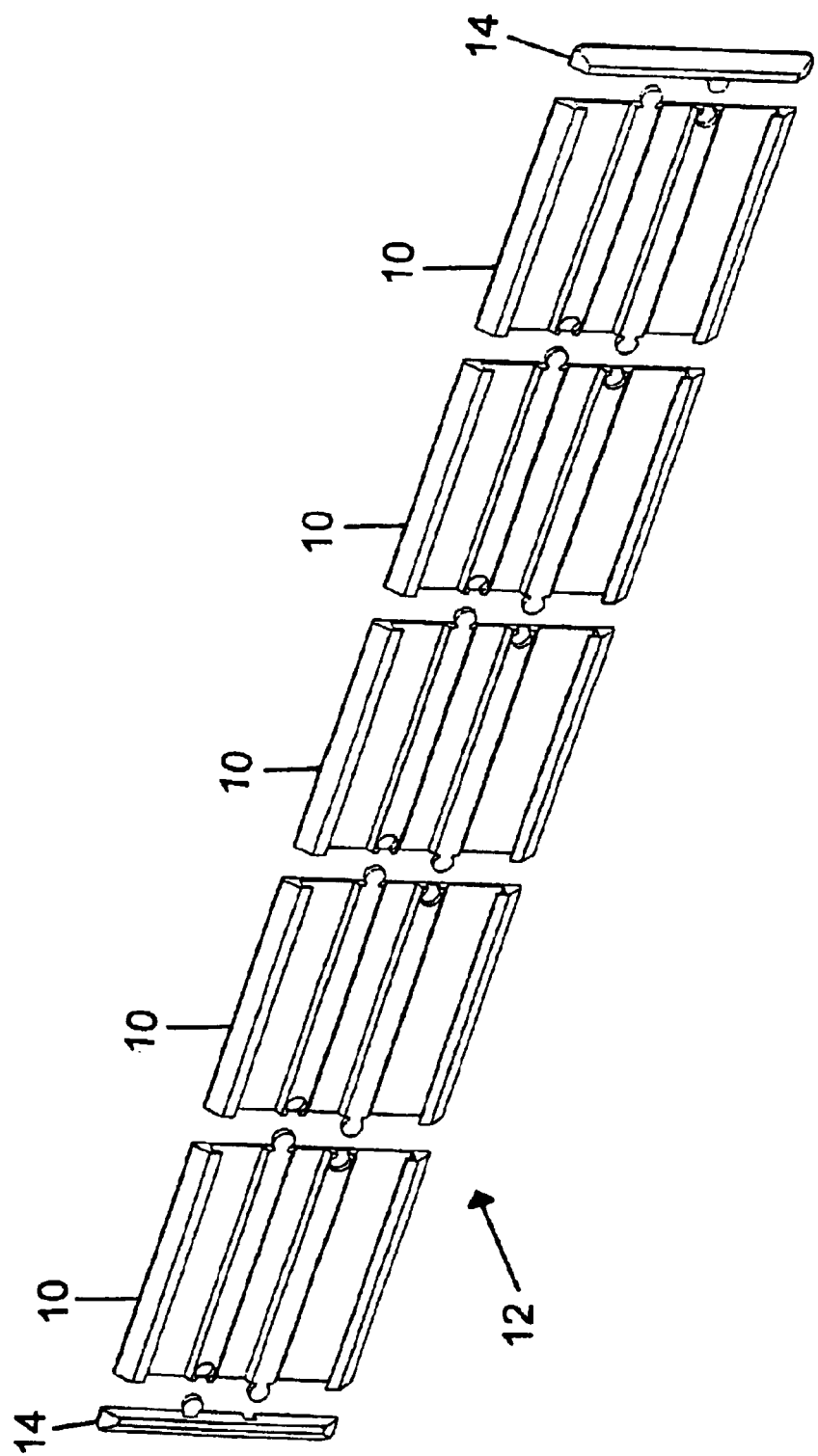
FIG. 1 shows an exploded view of a track.
Figure 2:
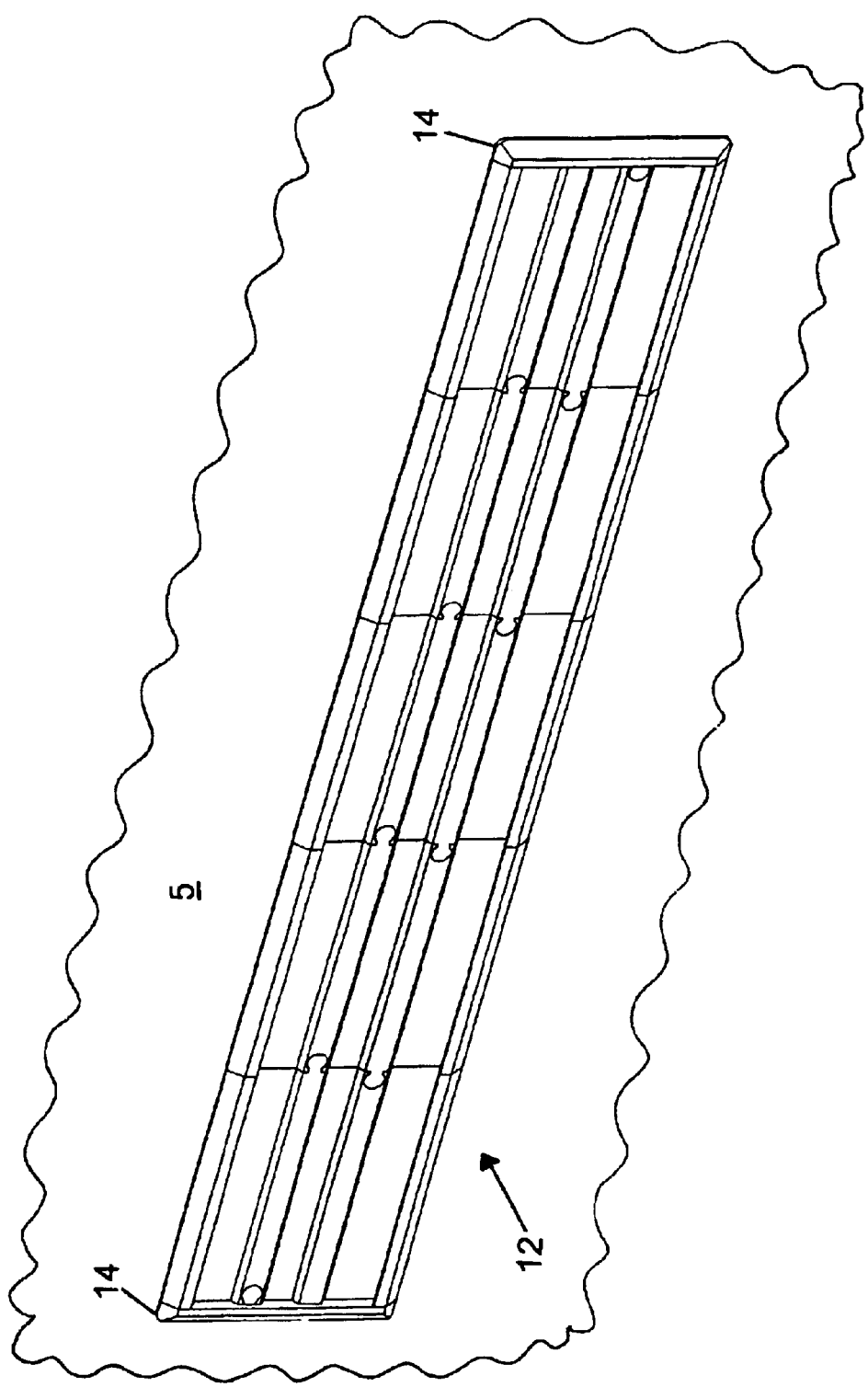
FIG. 2 shows an assembled track.

Referring now to the figures of the drawing in detail and first, particularly, to FIG. 1 thereof, there is shown an exploded view of a track 12 that includes a plurality of track sections 10. These track sections 10 can be assembled in front of a goal on a game playing surface 5, such as a hockey rink or a soccer field, to form the track 12 as shown in FIG. 2. Any number of track sections 10 can be provided, however, it is preferable to use five track sections 10 that are 72 inches long when put together. The track sections 10 are preferably made of a plastic, for example, polypropylene. After being used as will be described below, the track 12 can be disassembled and can then be assembled again on the same surface or on a different game playing surface as desired. The track 12 has end portions 14 that are connected to opposite ends of the connected track sections 10. Alternatively, the track could be provided as a single track section that is 72 inches long, for example.

Figure 3:
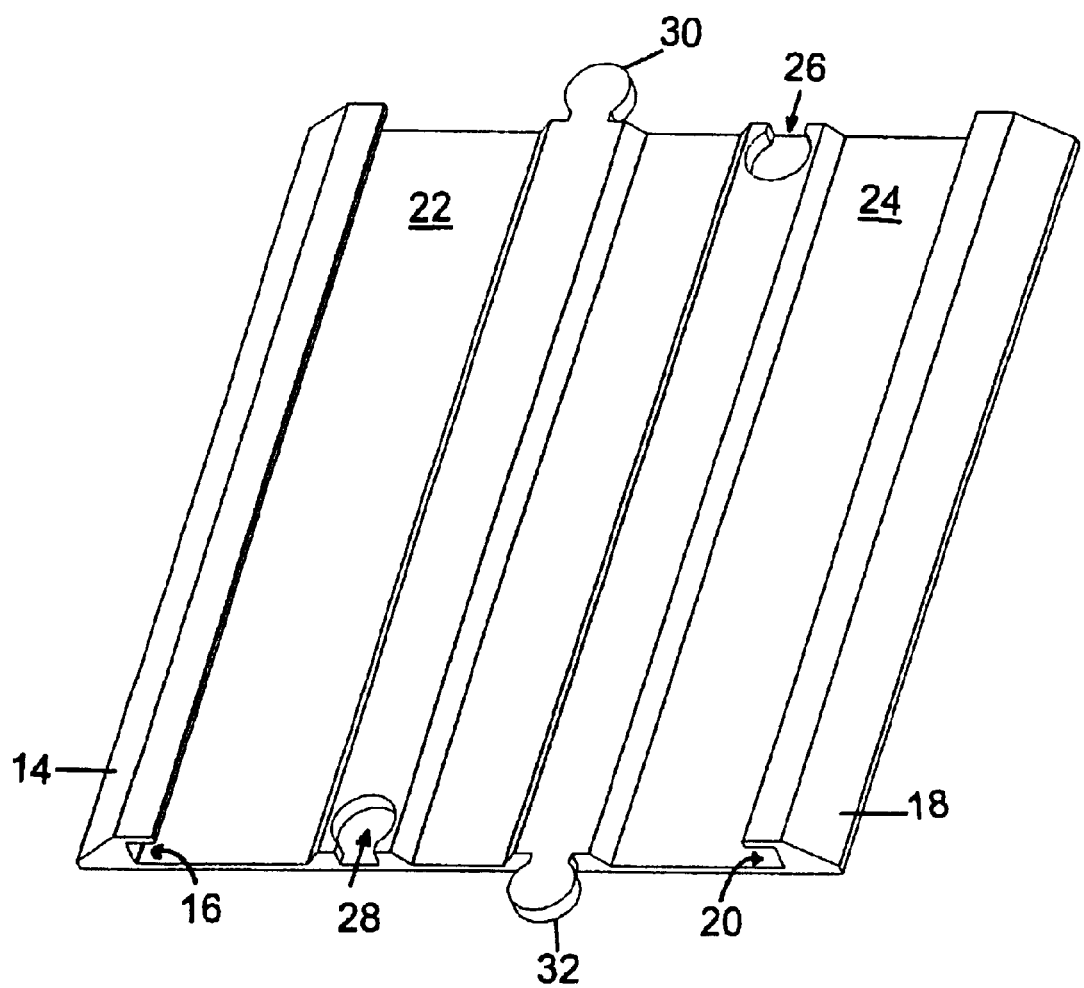
FIG. 3 shows a track section.
Figure 4:
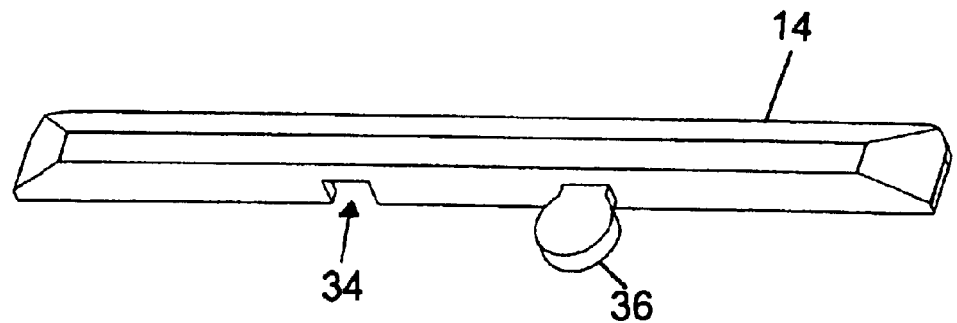
FIG. 4 shows an end portion.

FIG. 3 shows a track section 10 in greater detail. The track section 10 has a first side 14 with a first guide groove 16 formed therein. The track section 10 also has a second side 18 with a second guide groove 20 formed therein. The first groove 16 is opposite the second groove 20. These grooves 16, 20 cooperate with flanges on a base so that the base can move along the track 12 without being knocked off the track 12 when subjected to a transverse force. The track section 10 has flat surfaces 22 and 24 upon which the wheels of the base will roll. The base will be described in detail later below. The track section 10 has recesses 26, 28 and tongues 30, 32. The recess 26 and tongue 30 will mate with a corresponding recess and tongue of another track section 10 or with the recess 43 and tongue 36 of an end portion 14. Such an end portion 14 is shown in FIG. 4. The underside of the recess 34, which cannot be seen in the figure, has a contour shaped to match the contour of the tongue 30.

Figure 5:
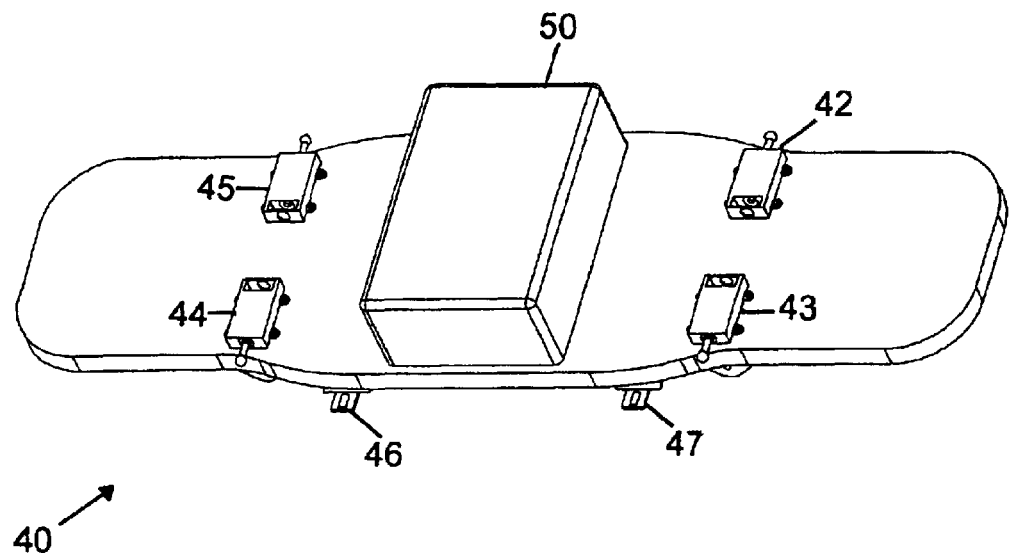
FIG. 5 shows a perspective view of a base.

FIG. 5 shows a perspective view of a base 40 that will move along the track 12. The base 40 and all components of the base 40 that will be subsequently described, except for the drive wheels, are preferably made of a plastic, for example, polypropylene. The base 40 has connectors 42–45 that are used to secure a goalie structure to the base 40. The base has a housing 50 that houses a non-illustrated motor. Each side of the base 40 is provided with at least one flange that will extend into one of the grooves 16 or 20 of the track sections 10. FIG. 5 shows that in the exemplary embodiment, two flanges 46, 47 have been provided on one side of the base 40. Two flanges have also been provided on the opposite side of the base 40, although this cannot be seen in the figure.

Figure 6:
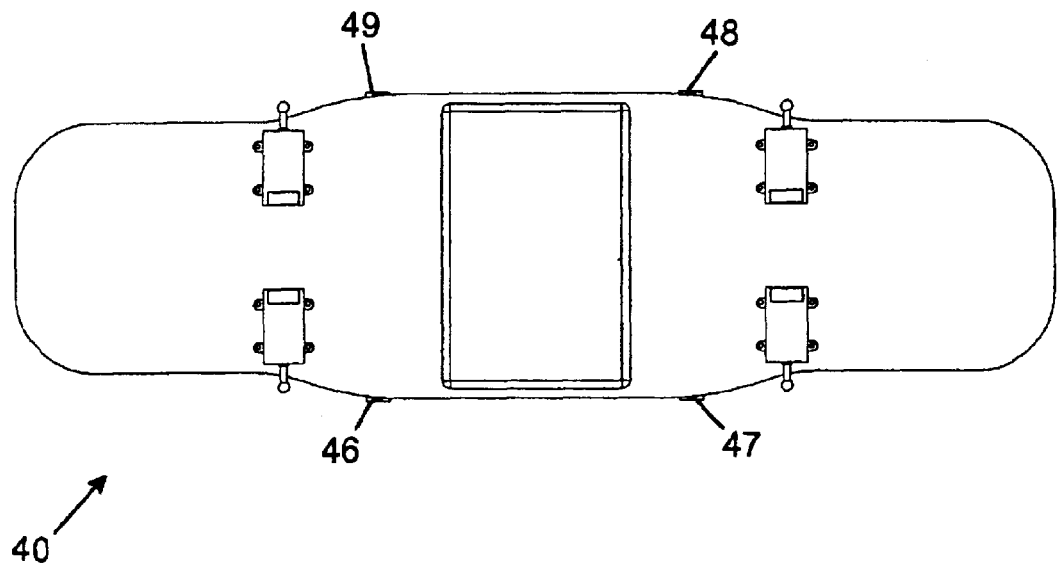
FIG. 6 shows a top view of the base.

FIG. 6 shows a top view of the base 40 so that all four flanges 46–49 can be seen. Before at least one of the end portions 14 is connected to the assembled track 12, the flanges 46–49 will be inserted into the recesses 16, 20 of the track portion 10 that is at an end of the track 12. The wheels of the base will come into contact with the flat surfaces 22 and 24 of the track portion 10.

Figure 7:
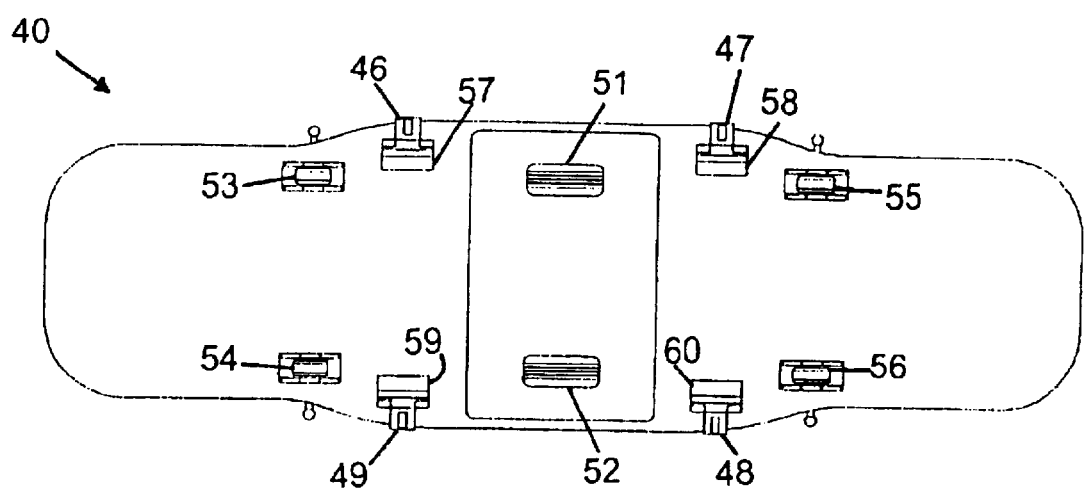
FIG. 7 shows a bottom view of the base.

FIG. 7 shows a bottom view of the base 40. The base 40 has at least one, and preferably two, drive wheels 51, 52 that are connected to the non-illustrated motor in order to move the base 40 along the length of the track 12. The drive wheels 51, 52 are preferable made of rubber and have knobs. The base 40 also preferably has guide wheels 53–56 that act to additionally support the base 40. The base 40 also preferably has stabilizer wheels 57–60 that are located near the flanges 46–49 and that act to support the base 40 near the flanges 46–49. This acts to reduce friction between the flanges 46–49 and the grooves 16, 20.

Figure 8:
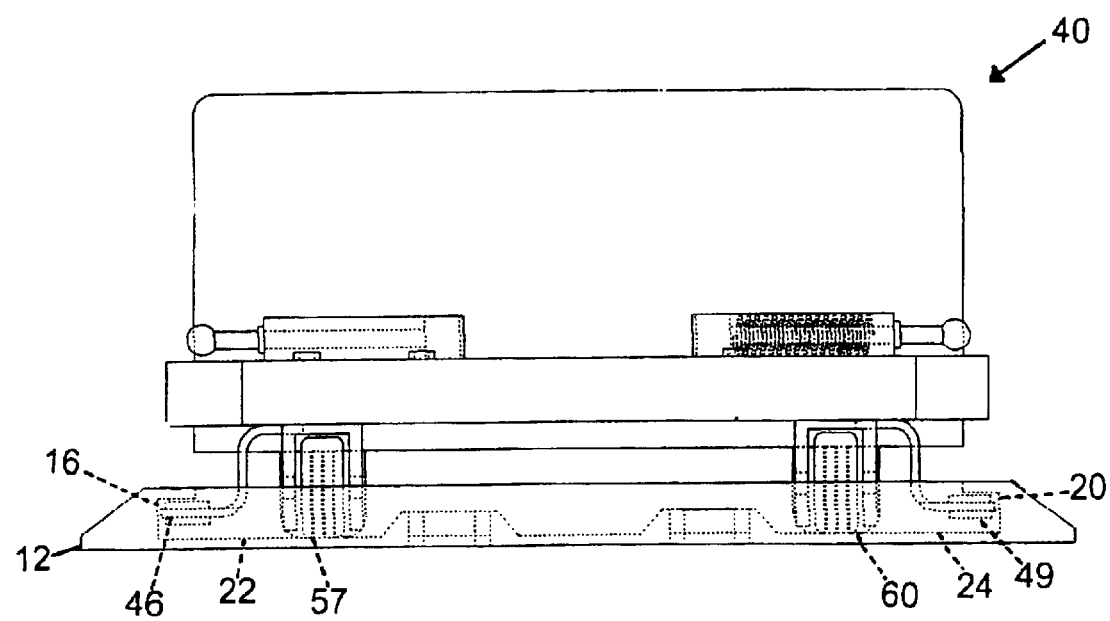
FIG. 8 shows a side view of the base on the track.
Figure 9:
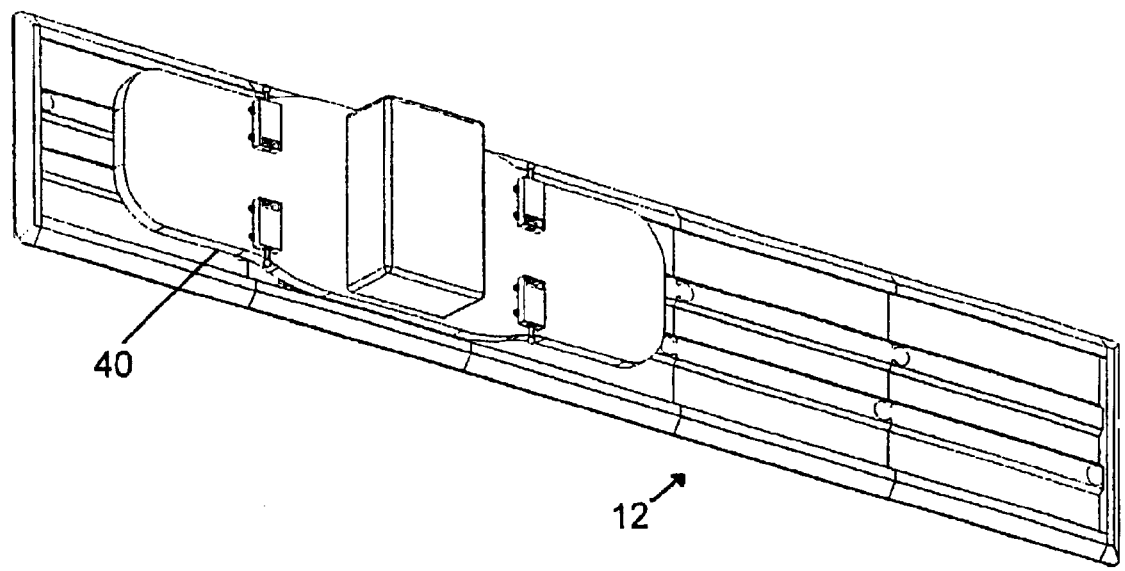
FIG. 9 shows a perspective view, from above, of the base on the track.

FIG. 8 is a side view of the base 40 on the track 12. FIG. 8 shows the flanges 46, 49 cooperating with the grooves 16 and 20 and shows the stabilizer wheels 57, 60 cooperating with the surfaces 22 and 24. These features are shown using dashed lines since they are hidden from view by the end portion of the track 12. FIG. 9 is a perspective view from above of the base 40 on the track 12.

Figure 10:
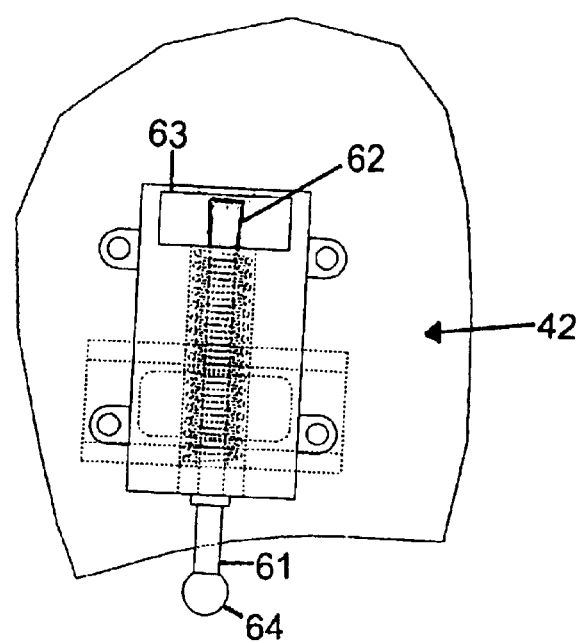
FIG. 10 shows a connector with a spring-loaded pin.

FIG. 10 shows a connector 42 with a spring-loaded pin 61. By pulling on the head 64 of the pin 61, the end 62 of the pin 61 can be retracted out of the recess 63 in order to place a loop of the goalie structure in the recess 63. When the head 64 is released, the end 62 of the pin 61 will pass through the loop and secure the loop of the goalie structure in the recess 63.

Figure 11:
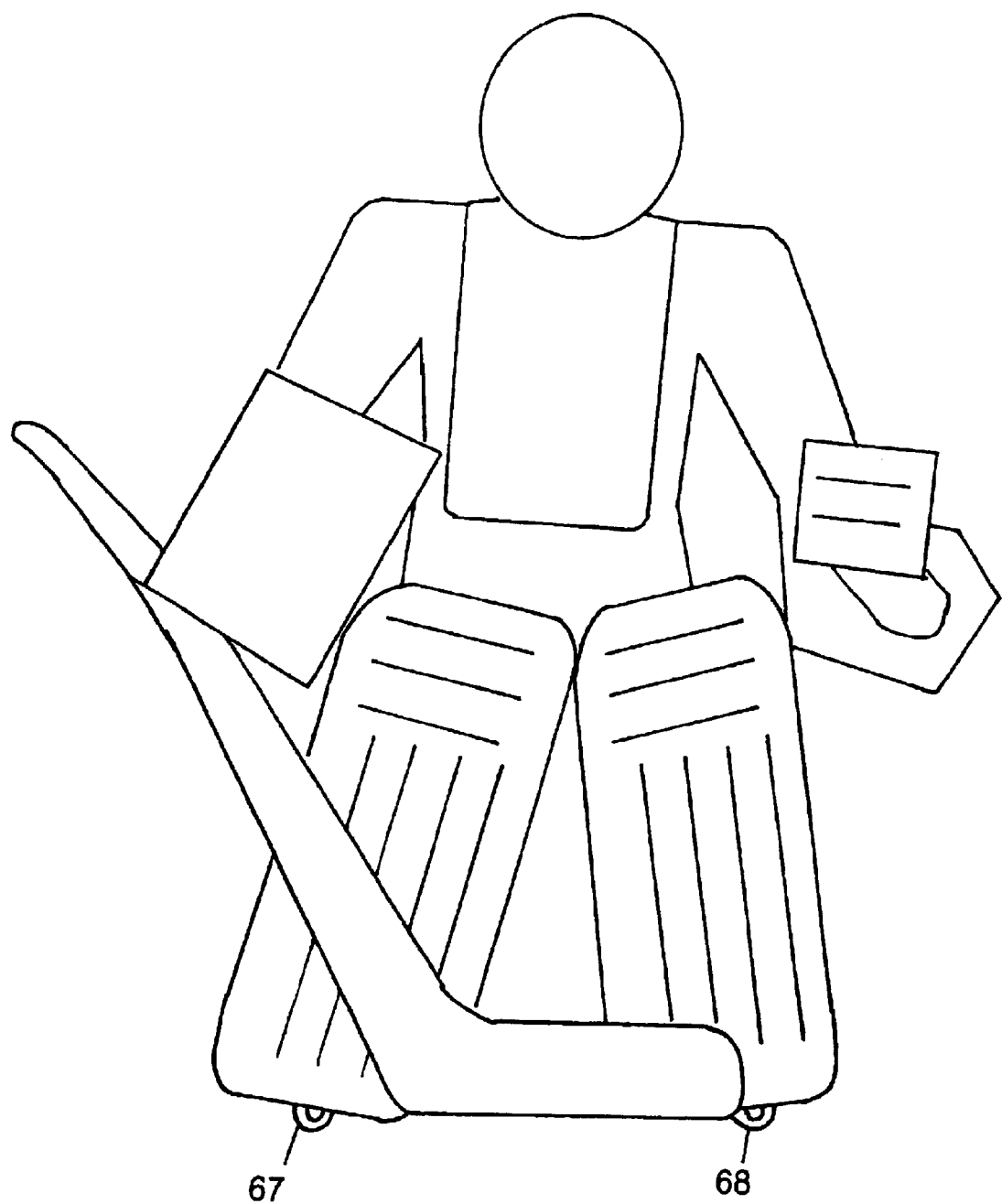
FIG. 11 shows a perspective view of a goalie structure.

FIG. 11 shows a front view of a goalie structure 66, which is preferably inflatable. The goalie structure 66 is in the form of a hockey goalie, however the goalie structure 66 can take the form of a soccer goalie or any suitable player from another sport. The bottom of the goalie structure 66 has four loops, two loops 67, 68 towards the front and two loops towards the back, which cannot be seen in the figure. The four loops will cooperate with the connectors 42–45 as discussed with reference to FIG. 9.

Once the track 12 has been assembled and before at least one of the end portions 14 is connected to the assembled track 12, the flanges 46–49 are inserted into the recesses 16, 20 of the track portion 10 that is at an end of the track 12. The remaining end portion 14 is then connected to complete the track 12. The hooks of the goalie structure 66 are then connected to the connectors 42–45 as discussed with reference to FIG. 9. When the goalie structure 66 is inflatable, safety is insured, since when person paying hockey or soccer, for example, collides with the goalie structure 66, a relatively soft collision occurs. Safety is also ensured, since no stabilizing bars are used to secure the base on the track 12. The cooperating flanges 46–49 and recesses 16, 20 secure the base 40 and therefore, the goalie structure 66 in the track 12 even when the goalie structure is subjected to a transverse force, for example, when hit by a player.

There are three different ways to control the movement of the goalie structure 66 on the track 12. A particular embodiment of the invention can be constructed to utilize only one of these ways or can be constructed so that an operator can choose to use whichever one suits him/her at any particular time.

Figure 12:
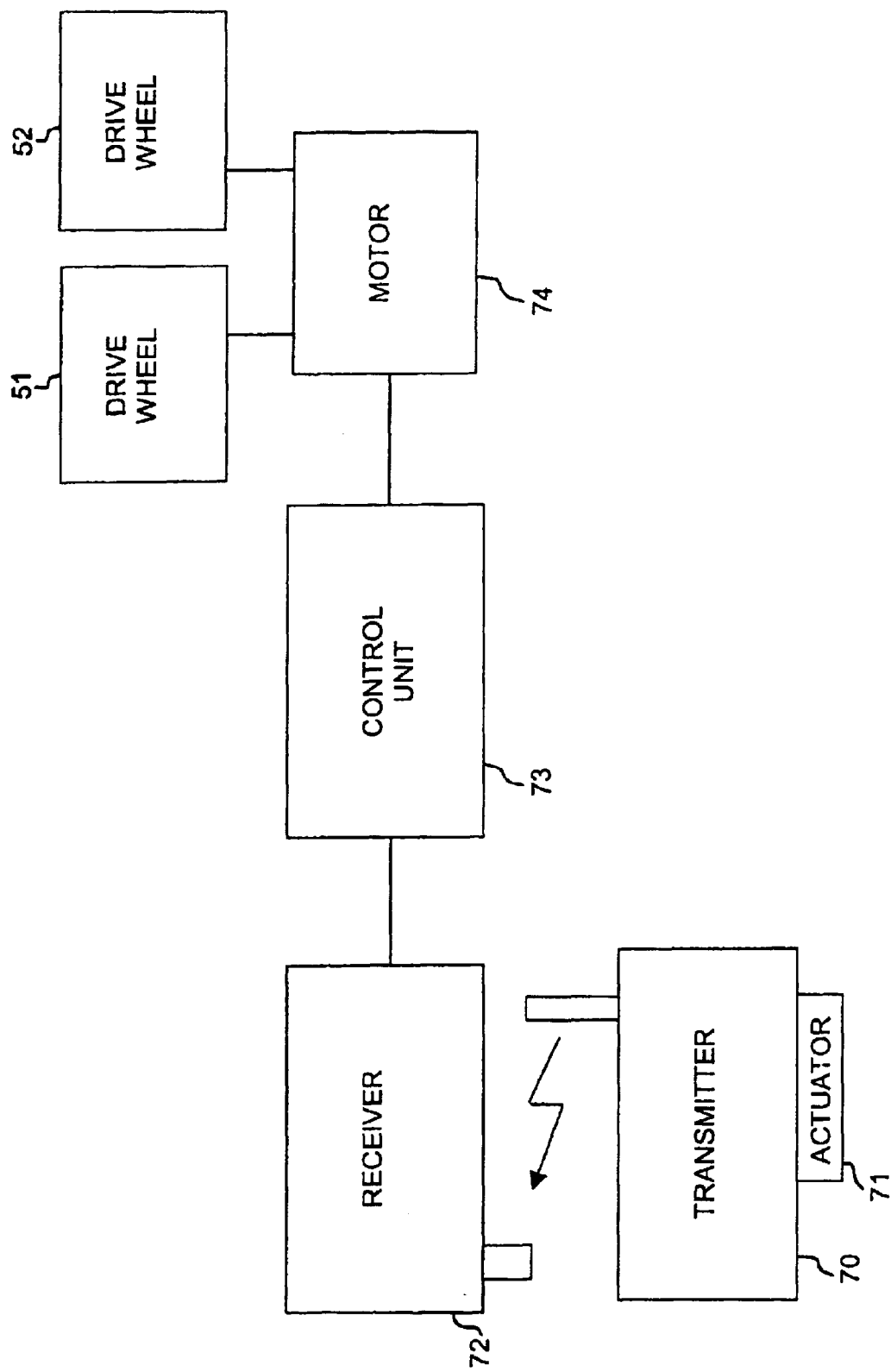
FIG. 12 shows a block diagram of components that are used to move the goalie structure by remote control.

A first movement method involves simply providing a remote control unit. FIG. 12 is a block diagram showing the components that are used when controlling the movement of the goalie structure 66 by remote control. A handheld transmitter 70, which is preferably shaped as a hockey puck when the goalie structure 66 is formed as a hockey goalie, has an actuator 71. This actuator 71 tells the transmitter 70 to send out a signal causing the goalie structure 66 to move to the right or left. The signal is received by the receiver 72, which passes the signal to the control unit 73. The control unit then causes the motor 74 to actuate the drive wheels 51, 52 in order to move the goalie structure 66 in a particular direction along the track 12. The receiver 72 and the control unit 73 will be constructed in the housing 50, which is shown in FIG. 5, of the base 40. The housing 50 can be constructed with non-illustrated vents, heat sinks, fans, or other mechanisms to dissipate the heat that will be generated by the motor 74. An operator can then control the movement of the goalie structure 66 in response to movements of the players on the playing surface.

Figure 13:
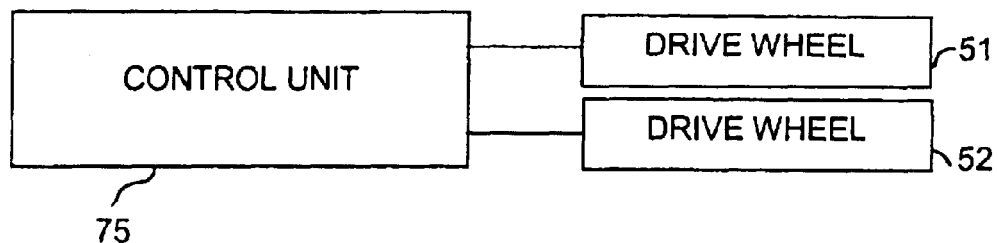
FIG. 13 shows a block diagram of components that are used to randomly move the goalie structure.

A second movement method is illustrated using FIG. 13 and involves providing a control unit 75 constructed to actuate the drive wheels 51, 52 so that the goalie structure 66 randomly moves between a plurality of fixed positions, preferably three positions on the track 12. Since the movement of the goalie structure 66 is random, a player will not know exactly where the goalie structure 66 might move and this will provide some level of challenge for a player.

Figure 14:
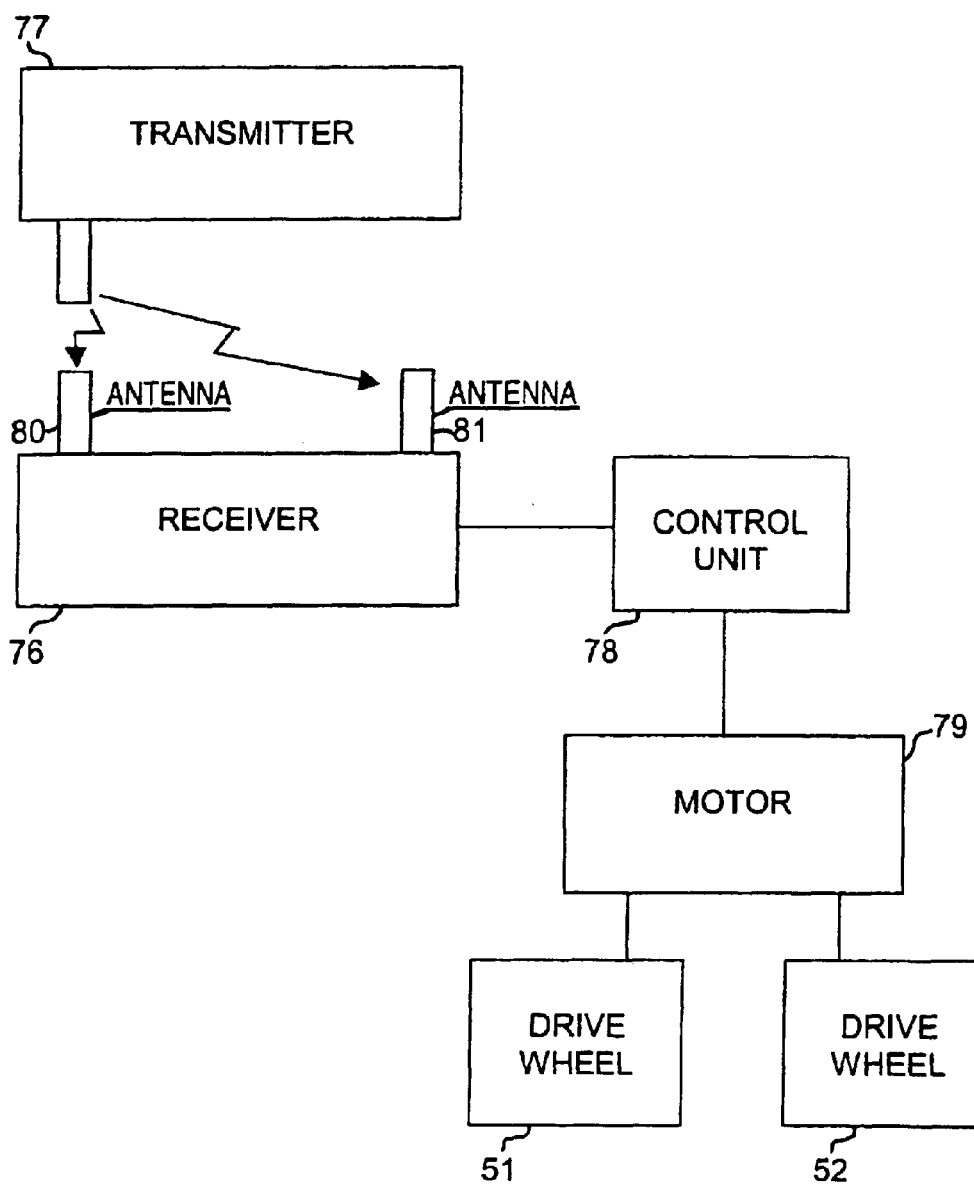
FIG. 14 shows a block diagram of components that are used to move the goalie structure in response to the movement of a hockey puck or a soccer ball.

A third movement method is illustrated using FIG. 14 and involves providing a transmitter 76 in a hockey puck or a soccer ball. A receiver 76, a control unit 78 and a motor 79 are constructed in the housing 50 of the base 40 (See FIG. 5). It is very difficult to detect the exact position of a hockey puck, for example, which moves very fast. A satisfactory solution can be found by moving the goalie structure 66 between two fixed side positions that are each, for example, located 18 inches inward from each post of the goal. The movement of the goalie structure 66 is controlled by analyzing the signals obtained by two antennas 80, 81 of the receiver 76. If it is determined that the transmitter 76 is located significantly outward with respect to one of the antennas 80, 81, then the control unit 78 will cause the motor 79 to actuate the drive wheels 51, 52 so that the goalie structure 66 will move toward the corresponding side position, if it is not already in that position.

Figure 15:
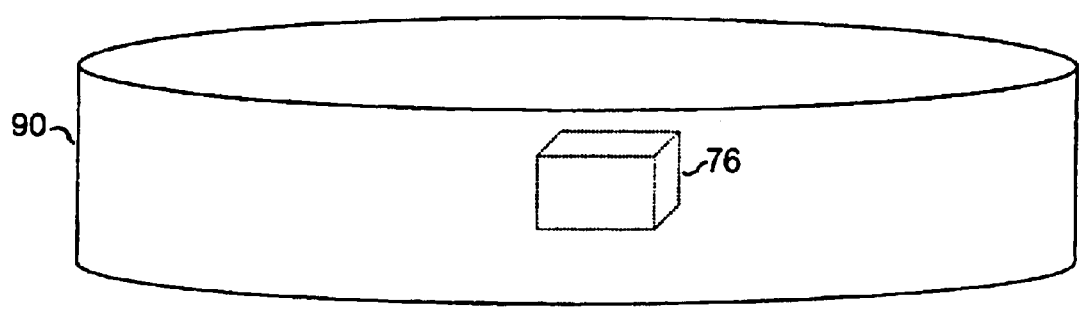
FIG. 15 shows a hockey puck.
Figure 16:
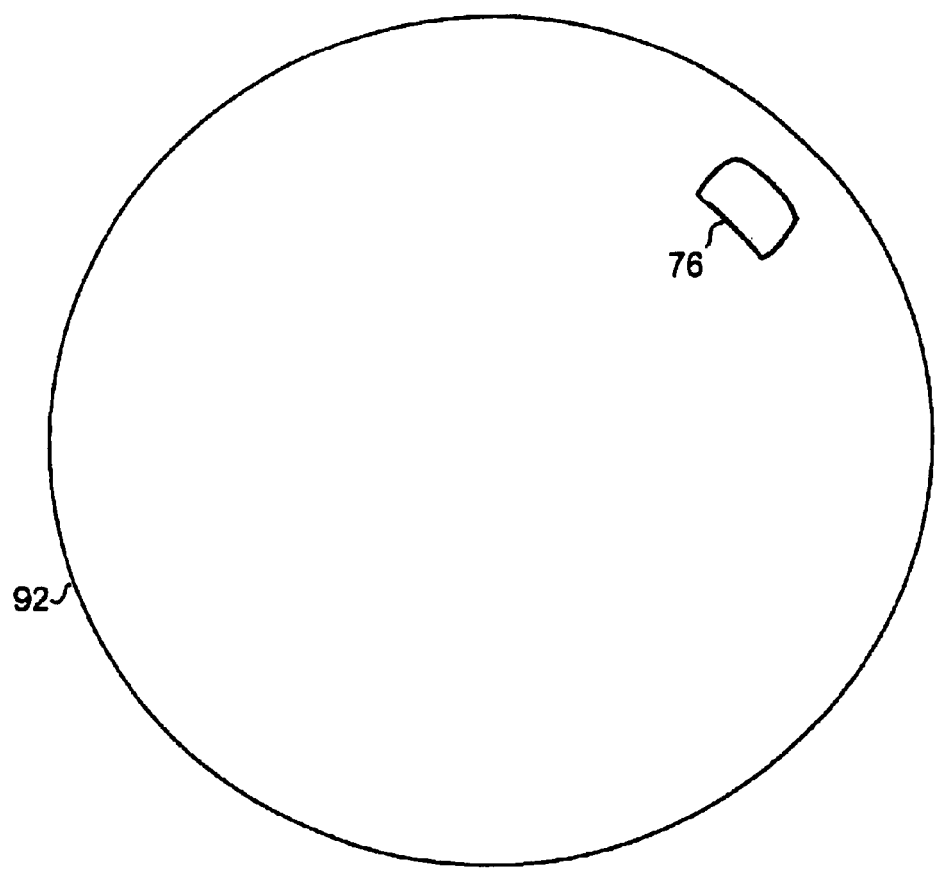
FIG. 16 shows a soccer ball.

FIG. 15 shows a hockey puck 90 constructed with the transmitter 76 therein. FIG. 16 shows a soccer ball 92 constructed with the transmitter 76 therein. The transmitter 76 is integrated into a padded lightweight structure that is sewn into the wall of the soccer ball 92.

The track 12 with the base 40 and the goalie structure 66 could be assembled once and left as a permanent device in front of a goal. However, it should be understood that the components described above can form component parts of a kit. The track sections 10 will be assembled on the game playing surface in front of a goal, and the base 40 will be properly inserted into the track 12 before attaching an end portion 14. The goalie structure 66 will then be attached to the base 40. The goalie structure 66 will then be moved to protect the goal while a player is practicing scoring on the goalie structure 66. When desired the components can be disassembled for storage and subsequent assembly on the same or another game playing surface.

We claim:

1. An assembly in combination with a puck having a transmitter, the assembly comprising:
   a track having a length;
   a goalie structure;
   a base supporting said goalie structure on top of said track, said base having wheels and a motor cooperating with at least one of said wheels for moving said goalie structure along said length of said track;
   a receiver unit constructed for making a determination as to whether said puck is towards a particular aide direction with respect to said base; and
   said receiver unit including a control unit for causing said motor to move said base toward said side direction.

2. An assembly in combination with a ball having a transmitter, the assembly comprising:
   a track having a length;
   a goalie structure;
   a base supporting said goalie structure on top of said track, said base having wheels and a motor cooperating with at least one of said wheels for moving said goalie structure along said length of said track;
   a receiver unit constructed for making a determination as to whether said ball is towards a particular side direction with respect to said base; and
   said receiver unit including a control unit for causing said motor to move said base toward said side direction.

3. A kit for assembling a moveable goalie comprising:
   a plurality of track sections to be assembled to form a track having a length;
   an inflatable goalie structure having at least one first connector;
   a base having at least one second connector for mating with said first connector to attach said inflatable goalie structure to said base;
   said base being configured to be moveable on top of said track, said base having wheels and a motor cooperating with at least one of said wheels for moving said goalie structure along said length of said track;
   a puck having a transmitter,
   a receiver unit constructed for making a determination as to whether said puck is towards a particular side direction with respect to said base; and
   said receiver unit including a control unit for causing said motor to move said base toward said side direction.

4. A kit for assembling a moveable goalie, comprising:
   a plurality of track sections to be assembled to form a track having a length;
   an inflatable goalie structure having at least one first connector;
   a base having at least one second connector for mating with said first connector to attach said inflatable goalie structure to said base;
   said base being configured to be moveable on top of said track, said base having wheels and a motor cooperating with at least one of said wheels for moving said goalie structure along said length of said track;

a ball having a transmitter;

a receiver unit constructed for making a determination as to whether said ball is towards a particular side direction with respect to said base; and said receiver unit including a control unit for causing said motor to move said base toward said side direction.

* * * * *

UNITED STATES PATENT AND TRADEMARK OFFICE
CERTIFICATE OF CORRECTION

PATENT NO. : 6,796,914 B2
DATED : September 28, 2004
INVENTOR(S) : Simon Berdugo It is certified that error appears in the above-identified patent and that said Letters Patent is hereby corrected as shown below:

Column 6,
Line 17, should read as follows:
-- to whether said puck is towards a particular side --

Signed and Sealed this

Twelfth Day of April, 2005

JON W. DUDAS
*Director of the United States Patent and Trademark Office*